United States Patent
Elshof

[19]

[11] Patent Number: 6,065,656

[45] Date of Patent: May 23, 2000

[54] TRAVEL MUG

[75] Inventor: Robert J. Elshof, Fort Collins, Colo.

[73] Assignee: Image Holdings, Inc., Houston, Tex.

[21] Appl. No.: 09/134,294

[22] Filed: Aug. 13, 1998

Related U.S. Application Data

[63] Continuation of application No. 29/087,994, May 13, 1998, Pat. No. Des. 420,550.

[51] Int. Cl.[7] ...................................................... A47K 1/08
[52] U.S. Cl. .......................... 224/275; 224/556; 224/926; 220/629; 220/630
[58] Field of Search .................................... 224/556, 275, 224/926; 220/629, 636, 729

[56] References Cited

U.S. PATENT DOCUMENTS

| | | | |
|---|---|---|---|
| 2,640,595 | 6/1953 | Byford | 224/926 X |
| 4,300,709 | 11/1981 | Page, Jr. | 224/926 X |
| 4,512,503 | 4/1985 | Gioso | 224/926 X |
| 4,629,153 | 12/1986 | Marcum | 224/556 X |
| 4,765,581 | 8/1988 | Wallace et al. | |
| 4,801,060 | 1/1989 | Thompson | 224/926 X |
| 4,896,858 | 1/1990 | Sokolski et al. | |
| 5,007,569 | 4/1991 | Zarb | 224/275 |
| 5,181,555 | 1/1993 | Chruniak | 224/926 X |
| 5,282,598 | 2/1994 | Greene | 224/556 X |
| 5,490,622 | 2/1996 | Tardif | |

Primary Examiner—Gregory M. Vidovich
Attorney, Agent, or Firm—Akin, Gump, Strauss, Hauer & Feld

[57] ABSTRACT

A beverage container having elongated side walls is provided. The container side walls are preferably generally cylindrical and having an upper end and a lower end. The container also having a base portion that is connected to the side walls at the lower end of the side walls. The container further includes a stabilizing arm that has a first end and a second end. The stabilizing arm is movably connected to the base portion so as to be movable with relation thereto. The stabilizing arm may thus be moved from a position in which the stabilizing arm first end is proximate to the base portion and lies in substantially the same plane as the base portion to a position in which the stabilizing arm first end is extended away from the base portion and lies in substantially the same plane as the base portion. The first end of the stabilizing arm, when extended away from the base portion, may be inserted within the crease between the seating portion and the back support portion of a vehicle seat. The stabilizing arm is preferably movably connected at the second end of the stabilizing arm to the base portion through a hinge, which may be an interconnected element or a section of relatively flexible material. Alternatively, the base portion may further have a track provided thereon and the stabilizing arm may be movably connected to the base portion by being disposed within such track. The first end of the stabilizing arm preferably includes an aperture disposed therethrough which allows the user to more easily manipulate the stabilizing arm.

9 Claims, 8 Drawing Sheets

TRAVEL MUG

This application is a continuation-in-part of application Ser. No. 29/087,994 filed May 13, 1998 now U.S. Pat. No. Des. 420,550.

BACKGROUND OF THE INVENTION

1. Field of the Invention

The present invention relates generally to beverage containers and more particularly to beverage containers that are not prone to overturning and spilling when the person utilizing the beverage container is traveling in an automobile or other vehicle.

2. Description of the Prior Art

Many people take beverages with them when traveling. Therefore, there is a need for means for preventing liquid-filled containers from overturning and spilling inside vehicles. This situation is recognized by vehicle manufacturers, many of which include beverage or cup holders built into the interior of some of their vehicles. However, not all vehicles have such built in beverage holders. In addition, many people have drinking containers that are larger than the standard size for such built in beverage holders. In particular, thermally-insulated containers, such as travel mugs, are typically relatively wide due to the presence of insulative material or spacing provided at the walls of the mugs. Such oversized mugs may not fit within the built in beverage holders of many vehicles.

Therefore, there is a need for a means for the prevention of spilling of liquid filled containers for persons whose vehicles do not have built in beverage holders or who choose to utilize beverage containers that are too large for such built in beverage holders. U.S. Pat. No. 5,490,622 to Tardif, U.S. Pat. No. 4,896,858 to Sokolaki et al., and U.S. Pat. No. 4,765,581 to Wallace et al. are examples of attempts to accomplish this end. Each of the above-identified patents discloses a beverage container holding assembly that include arms that extend outward from the beverage container. The beverage container holders of the type disclosed in the above-identified patents all describe that the extending arm is engageable with some portion of the vehicle door, the vehicle window or the slot between the vehicle door and window. To accomplish this, the extending arms of the beverage container holders of this type have a portion for engaging the vehicle that lies in a plane well above the plane in which the base of the beverage container lies.

When a beverage container holder is engaged with the door or window of a vehicle, it is difficult to operate such door or window without spilling the contents of the beverage container. Moreover, with this design, the extending arm is forced to support the weight of the beverage container. Furthermore, holders of the type described in the above-identified patents are relatively bulky in relation to the beverage container, in that they cannot be retracted within or otherwise incorporated within a beverage container so as to be "invisible" to the user.

SUMMARY OF THE INVENTION

The present invention provides a beverage container and base therefor that prevents the overturning and spilling of the beverage container while overcoming the disadvantages of the prior devices.

A beverage container having elongated side walls is provided. The container side walls are preferably generally cylindrical and having an upper end and a lower end.

The beverage container also has a base portion. The base portion of the container is connected to the side walls at the lower end of the side walls. Preferably, the base portion is formed as a separate component from the side walls and is then connected to affixed or detachably connected to the side walls, such as, for example, by a matching flange and groove relationship, by threaded engagement, by press fit engagement or through the use of an adhesive. Alternatively, the side walls and base portion may be integrally formed, that is formed of continuous sections of material so as to result in a unitary structure.

The container further includes a stabilizing arm that has a first end and a second end. The stabilizing arm is movably connected to the base portion so as to be movable with relation thereto. The stabilizing arm may thus be moved to a position in which the stabilizing arm first end is proximate to the base portion and lies in substantially the same plane as the base portion. In this position, the stabilizing arm is preferably virtually invisible in that no portion of the stabilizing arm extends out from the base portion of the container. In this position, the container appears to be a typical beverage container.

The stabilizing arm may also be moved to a position in which the first end of the stabilizing arm is extended away from the base portion and lies in substantially the same plane as the base portion. The first end of the stabilizing arm, when extended away from the base portion, may be inserted within the crease between the seating portion and the back support portion of a vehicle seat. When the stabilizing arm is so inserted within the vehicle seat crease, the container is effectively held in position and prevented from overturning and spilling liquid inside the container.

The stabilizing arm is preferably movably connected at the second end of the stabilizing arm to the base portion through a hinge, which may be an interconnected element or a section of relatively flexible material.

Alternatively, the base portion may further have a track provided thereon and the stabilizing arm may be movably connected to the base portion by being disposed within such track. The track is preferably a pair of opposed grooves that are sized and positioned so as to receive and retain the stabilizing arm while allowing the stabilizing arm to slide bidirectionally in relation thereto. In this embodiment, the stabilizing arm preferably includes a contact portion which abuts against a contact portion of the base portion once the first end of the stabilizing arm is extended fully away from the base portion.

The first end of the stabilizing arm preferably includes an aperture disposed therethrough which allows the user to more easily manipulate the stabilizing arm. In this way, one can insert a finger through the aperture and better grasp the stabilizing arm to move it through its movable positions.

Other objects and advantages of the invention will become apparent from a description of certain presently preferred embodiments thereof shown in the drawings.

DESCRIPTION OF THE PREFERRED EMBODIMENTS

Figure 1:
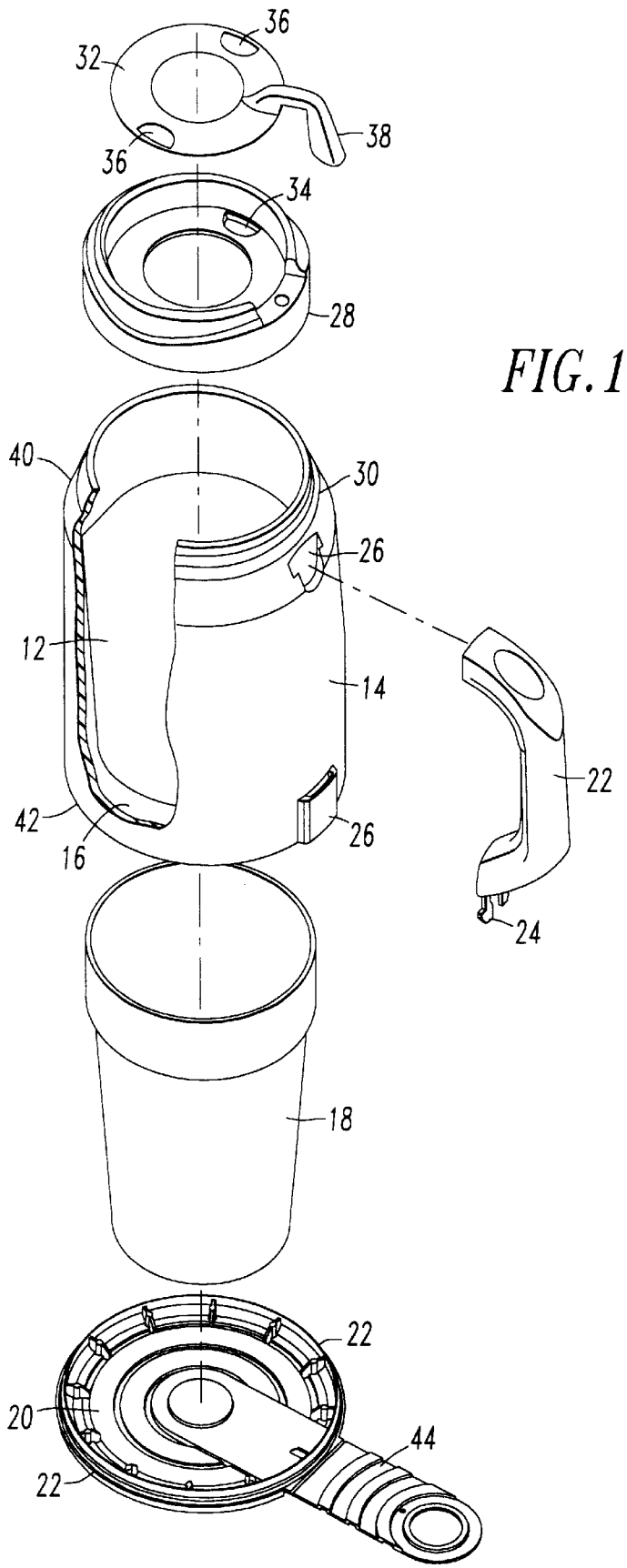
FIG. 1 is an exploded perspective view, partially broken away, of a beverage container in accordance with the present invention.

A beverage container designed so as to be engageable with the interior of a vehicle so as to stabilize the container, preventing it from overturning and spilling, is described herein. Aside from those parts of the container that contribute to the stabilization of the container, which are described in detail below, the remainder of the container may take numerous forms. A preferred embodiment of the container 10 is shown in FIG. 1.

The container preferably has an inner liquid containing portion 12, commonly called a liner. The container 10 further preferably has an outer jacket 14. The liner 12 and the outer jacket 14 are preferably separated by an air gap 16 that substantailly surrounds the inner liner 12.

A cup insert 18 made of an insulative material, such as expanded polystyrene, is then preferably disposed within the air gap 16 between the inner liner 12 and jacket 14. The cup insert 18 serves as insulation to deter heat transfer between the inner liner 12 and jacket 14.

The inner liner 12 and the outer jacket 14 are preferably molded integrally so that no joining operation is needed to form the air gap 16. The jacket 14 presents a side wall of the container 10, having an upper end 40 and a lower end 42. Although the jacket 14 is preferably generally cylindrical in shape, it will be understood that the present invention may be practiced with side walls 14 having any shape.

A base portion 20 is preferably connected to the lower end 42 of the outer jacket 14 to seal the bottom of the container 10. The base portion 20 is preferably made of polypropylene. A stabilizing arm 44 is movably connected to the base portion 20. The stabilizing arm 44 is preferably made of the same type of material as the base portion 20. The operation of the stabilizing arm 44 will be described in greater detail below.

It will be readily understood that the base portion 20 of the present invention may be connected to the side wall 14 of any container, regardless of the form in which the side wall embodies. Preferably, the base portion 20 is formed as a separate component from the side walls 14 of the container, and is then affixed or detachably connected to the side walls 14, such as, for example, by a matching flange and groove relationship, by threaded engagement, by press fit engagement or through the use of an adhesive. Alternatively, the side walls 14 and base portion 20 may be integrally formed, that is formed of continuous sections of material so as to result in a unitary structure.

The container 10 further preferably includes handle 22 which is connected to the side walls 14, preferably through handle clasps 24 being snapped into engagement with receiving grooves 26 disposed on the outer jacket 14.

The container further includes a lid 28 which preferably snap fits into place over a radiused and undercut lip 30 provided at the upper end 40 of the side walls 14 to form a tight seal. The lid 28 preferably cooperates with a closure 32 that is used to open or close a drinking port 34. Closing the port 34 serves to maintain temperature of the liquid contained within the container 10 and also serves to greatly impede the spillage of the liquid in case the container is dropped or upset.

The closure 32 has at least one and preferably two openings 36 disposed therethrough. The closure 32 is then set upon the lid 28 and is capable of rotating in relation to the lid 28. When the closure 32 is rotated to a position where a closure opening 36 is generally aligned with the drinking port 34, the drinking port 34 is said to be open. When the closure 32 is rotated so that a closure opening 36 is not aligned with the drinking port 34, the drinking port 34 is said to be closed. The closure 32 also has a lever 38 that protrudes beyond and down the diameter of the lid 28 in such a fashion that it can be operated with the thumb while grasping the handle 22 in order to rotate the closure 32.

Figure 2:
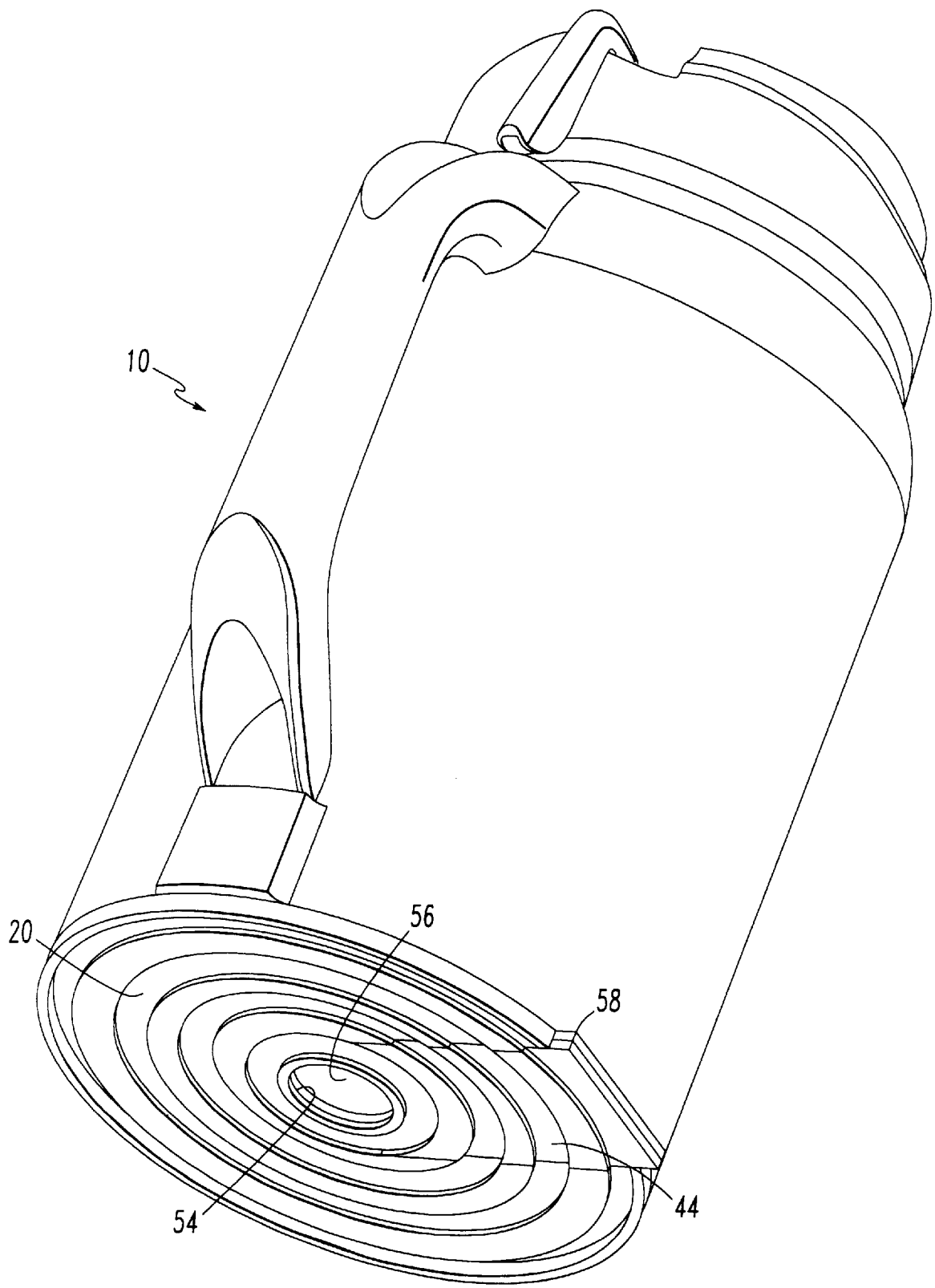
FIG. 2 is a perspective view of a beverage container in accordance with the present invention shown in a retracted position in which its stabilizing arm is held proximate to the container base.
Figure 3:
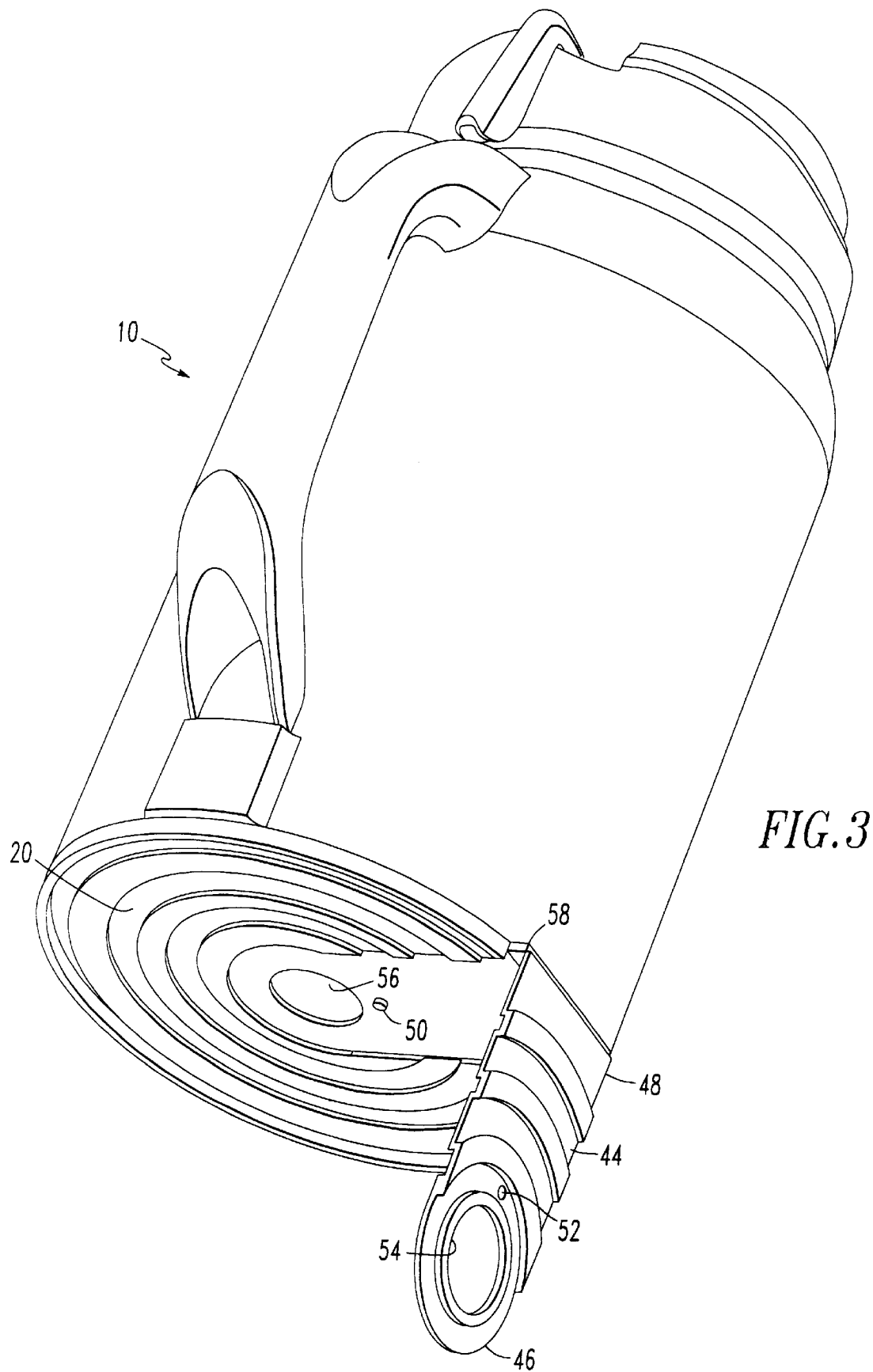
FIG. 3 is a view similar to FIG. 2 in which the beverage container is shown in an intermediate position in which the stabilizing arm is partially extended from the container base.
Figure 4:
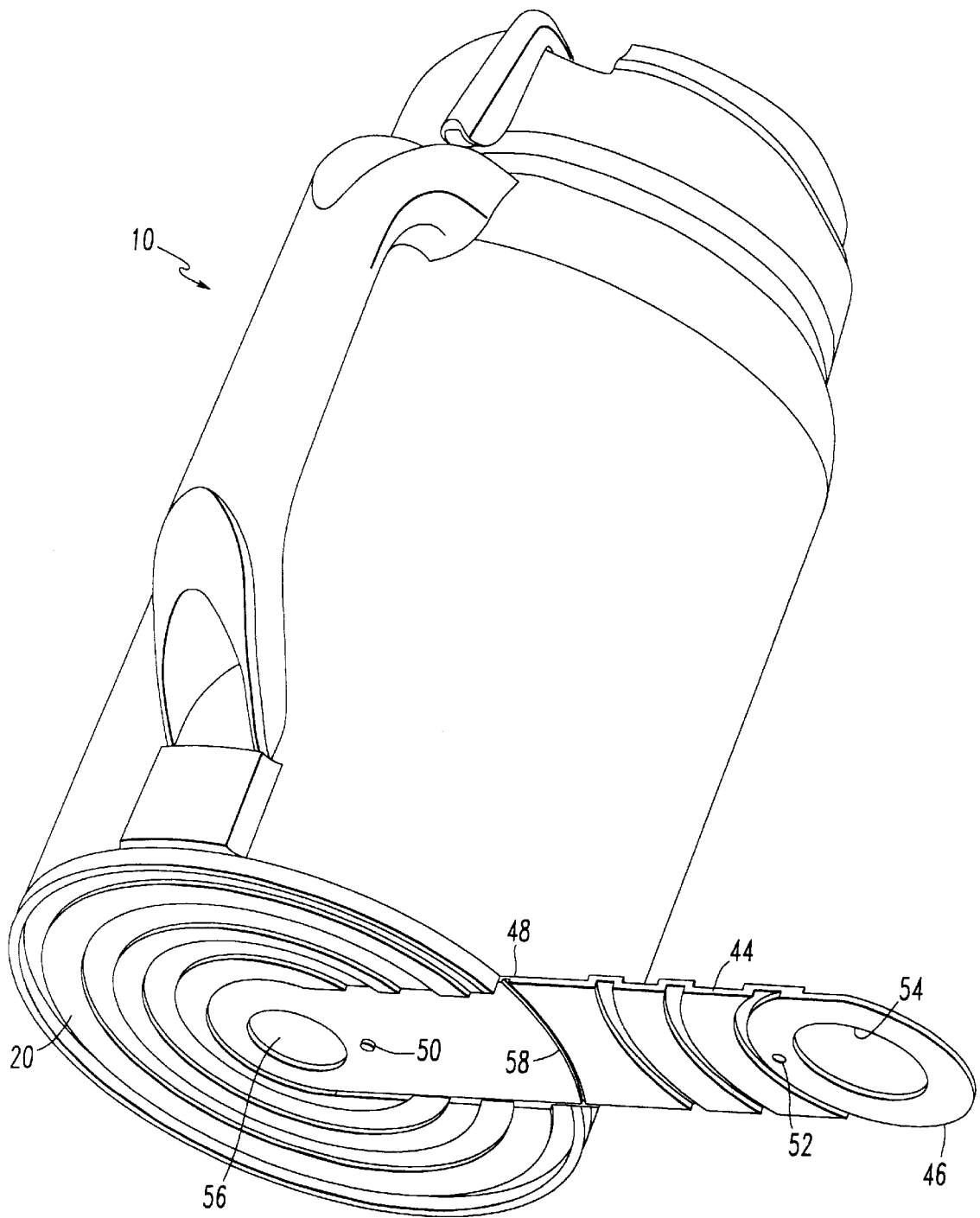
FIG. 4 is a view similar to FIG. 2 in which the beverage container is shown in an extended position in which the stabilizing arm is fully extended away from the container base.

Referring next to FIGS. 2, 3 and 4, the operation of the stabilizing arm 44 will be described in greater detail. The stabilizing arm 44 has a first end 46 and a second end 48 (see FIG. 3). The stabilizing arm 44 is movably connected to the base portion 20 so as to be movable in relation thereto. The stabilizing arm 44 may thus be moved to a position shown in FIG. 2 in which the stabilizing arm first end 46 is proximate to the base portion 20 and lies in substantially the same plane as the base portion 20. In this position, no portion of the stabilizing arm 44 extends out from the base portion 20 of the container 10.

The first end 46 of the stabilizing arm 44 may be held or retained in position against the bottom of the base portion 20 by any convenient means, such as through the use of a detent 50 and a corresponding holding aperture 52. As can be seen best in FIG. 3, the holding aperture 52 is disposed through the stabilizing arm 44. A protrusion or detent 50 is then provided on the base portion 20 at a location that corresponds to the position of the holding aperture 52 when the stabilizing arm 44 is positioned as shown in FIG. 2. The detent 50 and holding aperture 52 are sized and configured so that that the detent 50 will snugly engage the holding aperture 52 when the stabilizing arm 44 is moved into this position, thereby retaining the stabilizing arm 44 in this position.

Figure 5:
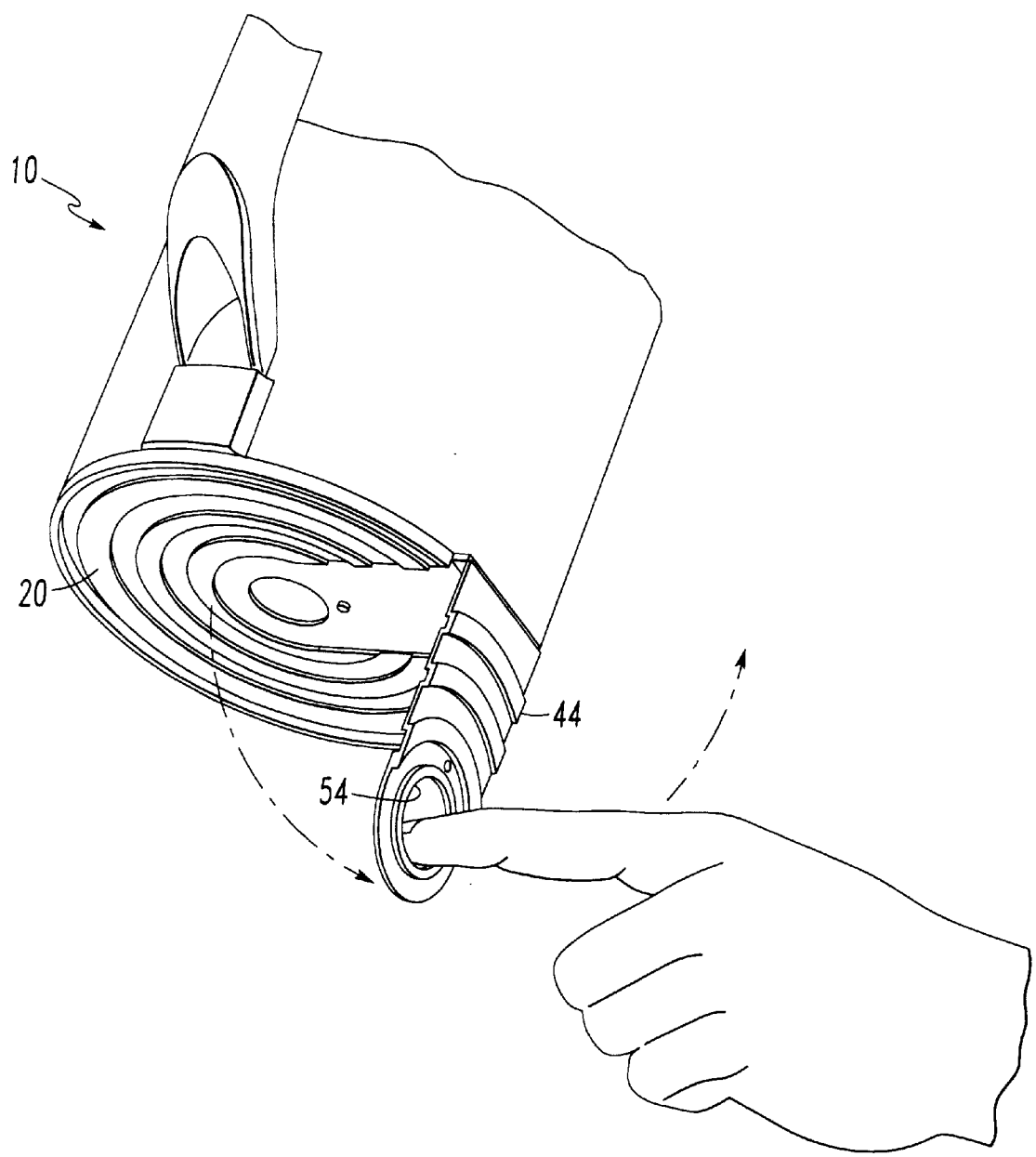
FIG. 5 is a perspective view of the beverage container and an operator, partially broken away, showing the hinged action of the stabilizing arm.

The stabilizing arm 44 also preferably includes an operating aperture 54 disposed through the first end 46 thereof. The base portion 20 preferably has a corresponding channel 56 which aligns with the operating aperture 54 of the stabilizing arm 44. The operating aperture 54 allows the user to more easily manipulate the stabilizing arm 44. In this way, one can insert a finger through the operating aperture 54 and better grasp the stabilizing arm 44, as can be seen in FIG. 5, to move the stabilizing arm 44 through its range of motion.

The stabilizing arm 44 may also be moved to a position in which the first end 46 of the stabilizing arm 44 is extended partially away from the base portion 20, as shown in FIG. 3. It is readily apparent that the stabilizing arm 44 may be moved through a number of positions relative to the base portion 20, beyond what is depicted in the figures.

The stabilizing arm 44 may be movable relative to the base portion 20 through any convenient mean. The stabilizing arm 44 is preferably movably connected at its second end 48 to the base portion 20 through a hinge 58. The hinge may be an interconnected element (not shown) or a section of relatively flexible material. The hinge 58 is preferably created by reducing the thickness of the stabilizing arm at the flexure point, i.e., where the second end 48 of the stabilizing arm 44 connects to the base portion 20. This construction is generally referred to as a living hinge.

The stabilizing arm 44 may also be moved to a position in which the first end 46 of the stabilizing arm 44 is extended fully away from the base portion 20 and lies in substantially the same plane as the base portion 20, as shown in FIG. 4. When the first end 46 of the stabilizing arm 44 is so extended away from the base portion 20, the stabilizing arm 44 may engage a vehicle seat 60 (see FIG. 6) in order to stabilize the container 10 and prevent the container 10 from overturning.

Figure 6:
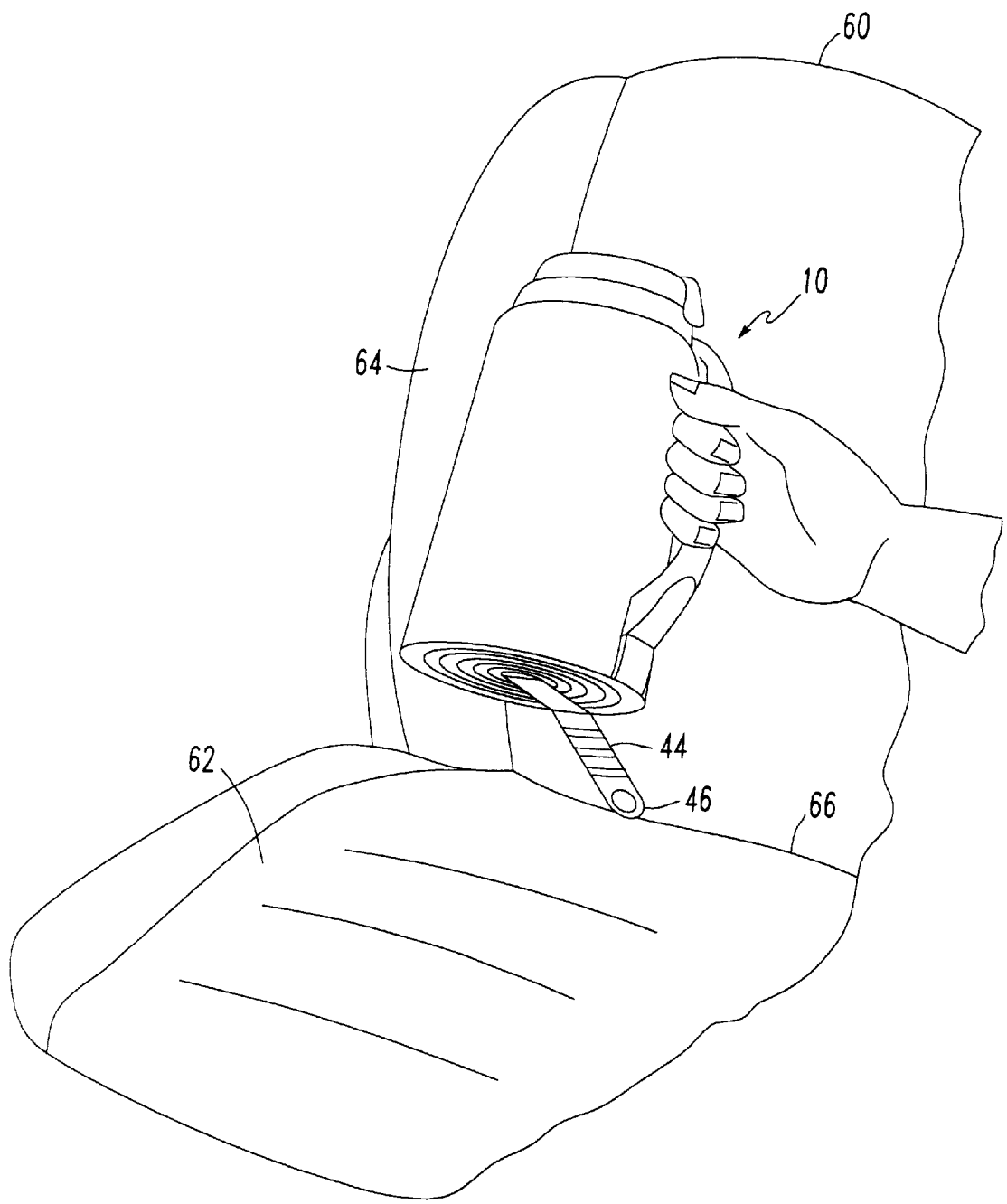
FIG. 6 is a perspective view, partially broken away, showing the stabilizing arm in the extended position and just prior to engagement with the seat of a vehicle.
Figure 7:
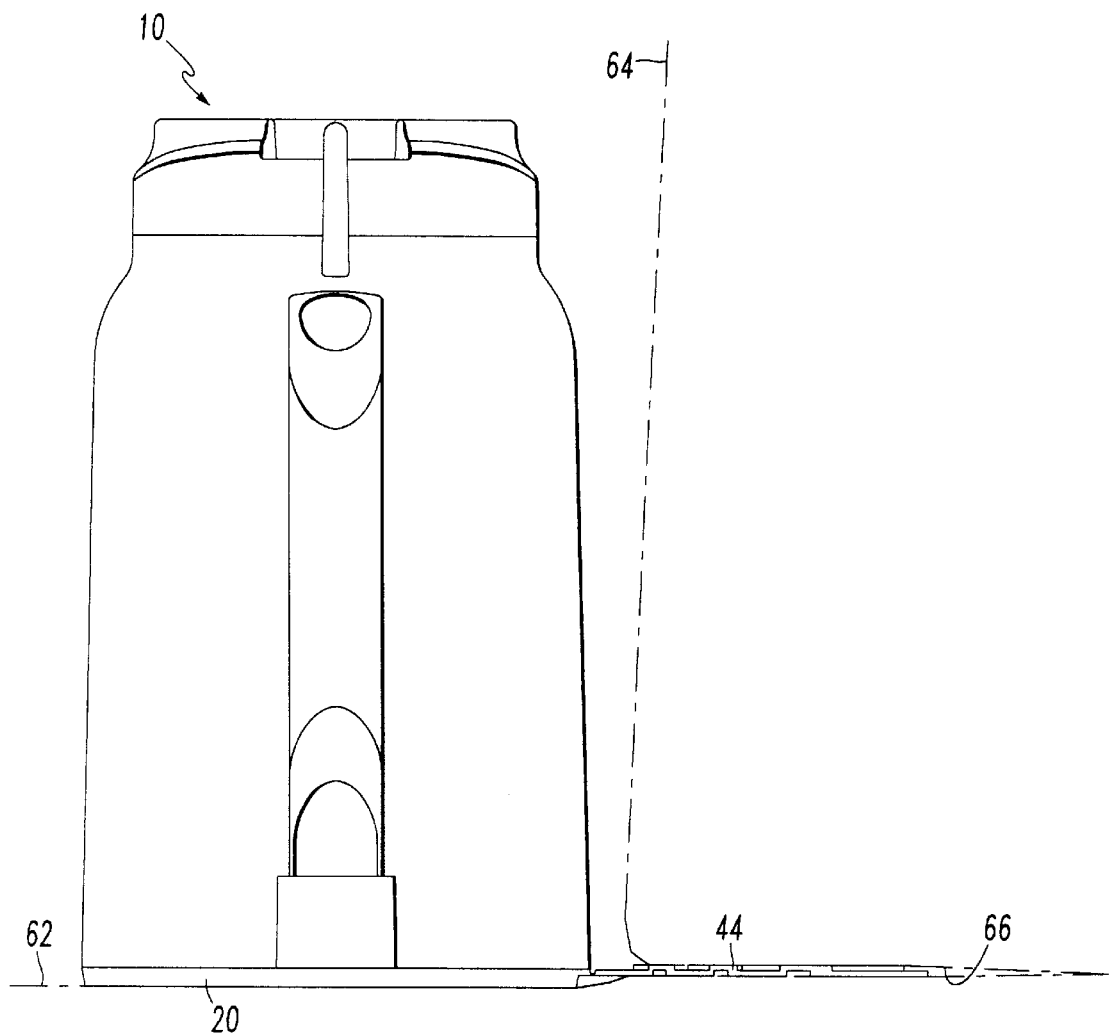
FIG. 7 is a side elevational view of the beverage container showing the stabilizing arm in the extended position and in engagement with the seat of a vehicle.

Referring next to FIGS. 6 and 7, the stabilizing arm 44 is shown engaging a vehicle seat 60. A vehicle seat is typically constructed of a seating portion 62 and a back support 64. The seating portion 62 and a back support 64 meet and form a crease 66. The first end 46 of the stabilizing arm 44 may be inserted within the seat crease 66 between the seating portion 62 and the back support portion 64. When the stabilizing arm 44 is so inserted within the seat crease 66, the frictional force of the seating portion 62 and back support 64 acting on the stabilizing arm 44, effectively hold the stabilizing arm 44 in position. As the stabilizing arm 44 is connected to the remainder of the container 10, the container 10 is thus effectively held in position and prevented from overturning and spilling liquid inside the container.

Figure 8:
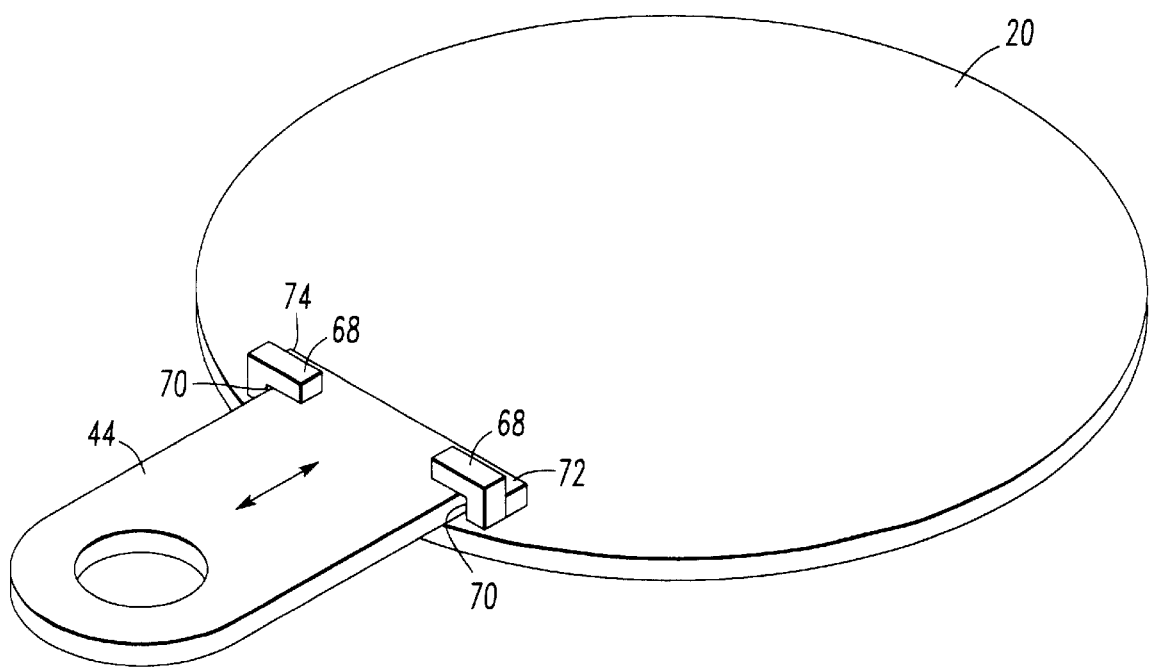
FIG. 8 is a base portion and stabilizing arm of a beverage container according to a second preferred embodiment of the invention.

Variations of the preferred embodiments described herein may be made while remaining within the spirit of the present invention. For example, although a living hinge 58 is preferred, the stabilizing arm may move relative to the base portion 20 by any convenient means, such as through a guided track relationship. Referring to FIG. 8, the base portion 20 may have a track 68 provided thereon and the stabilizing arm 44 may be movably connected to the base portion 20 by being disposed within such track 68. The track 68 may be a pair of opposed grooves 70 that are sized and positioned so as to receive and retain the stabilizing arm 44 while allowing the stabilizing arm 44 to slide bidirectionally in relation thereto as depicted by the arrows in FIG. 8. In this embodiment, the stabilizing arm preferably includes a contact portion 72 which abuts against a corresponding contact portion 74 of the base portion 20 once the first end 46 of the stabilizing arm 44 is extended fully away from the base portion 20. The grooves 70 may be positioned any distance apart to allow for different widths of stabilizing arms 44.

While certain presently preferred embodiments have been shown and described, it is distinctly understood that the invention is not limited thereto and may be otherwise embodied within the scope of the following claims.

What is claimed is:

1. A beverage container comprising:

elongated side walls having an upper end and a lower end;

a base portion connected to said side walls at said lower end of said side walls and lying substantially in a plane, said base portion having a lower face with a recess provided thereon; and a stabilizing arm having a first end and a second end, wherein the stabilizing arm is movably connected to said base portion so as to be movable from a position in which the first end of said stabilizing arm is disposed within said recess of said base portion and lies in substantially the same plane as the base portion to a position in which the first end of said stabilizing arm is extended away from said base portion and lies in substantially the same plane as the base portion.

2. The beverage container of claim 1 wherein the stabilizing arm is moveably connected at the second end of said stabilizing arm to said base portion through a hinge.

3. The beverage container of claim 2 wherein the hinge is comprised of a section of flexible material.

4. The beverage container of claim 1 wherein the first end of said stabilizing arm includes an aperture disposed therethrough.

5. The beverage container of claim 4 wherein said base portion further includes a channel provided thereon which aligns with said stabilizing arm aperture when said stabilizing arm first end is in a position proximate to said base portion.

6. The beverage container of claim 2 wherein said hinge is comprised of a section of material having reduced thickness where said second end of said stabilizing arm connects to said base portion.

7. The beverage container of claim 1 wherein said base portion and said stabilizing arm each further include respective contacting portions which cooperate to retain said stabilizing arm first end in a position proximate to said base portion.

8. The beverage container of claim 1 further comprising a handle provided on one of said side walls lying substantially in a plane that is generally perpendicular to the plane in which the base portion lies.

9. A beverage container comprising:

an elongated side wall having an upper end and a lower end;

a base portion connected to said side wall at said lower end of said side wall and lying substantially in a plane, said base portion having a lower face with a recess provided thereon;

a handle provided on said side wall lying substantially in a plane that is generally perpendicular to the plane in which the base portion lies; and a stabilizing arm having a first end and a second end, wherein the stabilizing arm is movably connected to said base portion so as to be movable from a position in which the first end of said stabilizing arm is disposed within said recess of said base portion and lies in substantially the same plane as the base portion to a position in which the first end of said stabilizing arm is extended away from said base portion and lies in substantially the same plane as the base portion.

* * * * *